United States Patent

[11] 3,566,841

[72] Inventors John B. Gerrish;
William G. Bickert, East Lansing, Mich.
[21] Appl. No. 840,950
[22] Filed July 11, 1969
[45] Patented Mar. 2, 1971
[73] Assignee Research Corporation
New York, N.Y.

[54] MILK MONITOR AND SYSTEM
5 Claims, 6 Drawing Figs.
[52] U.S. Cl. ................................................. 119/14.15,
137/624.11, 324/23, 119/14.03, 119/27
[51] Int. Cl. ....................................................... A01j 05/00,
A01j 07/00
[50] Field of Search ............................................ 119/14.14,
14.15, 14.17, 14.03; 137/624.11, 624.14, 551;
73/422 (Cursory); 324/23

[56] References Cited
UNITED STATES PATENTS
| | | | |
|---|---|---|---|
| 2,898,549 | 8/1959 | Miller............................. | 324/30 |
| 3,115,116 | 12/1963 | Schilling et al. .............. | 119/14.08 |
| 3,159,138 | 12/1964 | Olsson........................... | 119/14.17 |

Primary Examiner—Aldrich F. Medbery
Attorney—Stowell and Stowell

ABSTRACT: A milking system is provided in which an electrodeless conductivity meter continuously monitors milk from each cow and sensed data from each of the meters determines when milking is complete and screens for abnormal milk. The meter may be incorporated in a system to sequentially activate various relays and timers connected to automatic stall gates, washers, feeders, etc., to thereby reduce to a minimum mantime normally required during milking procedures.

PATENTED MAR 2 1971

INVENTORS.
JOHN B. GERRISH
WILLIAM G. BICKERT

BY *Stowell & Stowell*

ATTORNEYS.

= COW.
= COW BEING STIMULATED.
= COW BEING MILKED.
☐ = IDLE MILKING MACHINE.
O = WORKING MILKING MACHINE.
⊗ = MILKER PUTTING MACHINE ON COW.

INVENTORS.
JOHN B. GERRISH
WILLIAM G. BICKERT

BY *Stowell & Stowell*

ATTORNEYS.

MILK MONITOR AND SYSTEM

BACKGROUND OF THE INVENTION

In view of the substantial rise in farm labor costs it has been the desire of the dairy industry to reduce to a minimum man-time normally required during milking procedures, and to utilize to the fullest extent automatic milk-handling equipment. Such prior art systems include automatic milkers and so-called automatic cow stalls or parlors.

The present invention is primarily directed to an electrodeless monitoring meter which is connected in the milk flow path from each milking machine and which is adapted to sense the flow of milk to thereby deactivate the milking machine when the flow of milk from the cow ceases or falls below a predetermined amount.

It is a further object to provide such a meter which automatically screens the milk to determine if the milk is satisfactory for further use or is abnormal to the extent of containing a high bacterial cell count and/or chloride concentration.

It is a further object of the present invention to provide such a monitoring system which may be connected to automatic feeders, stall gates, teat washers, milk stimulators, etc., in a sequential pattern whereby a single operator may conveniently service a number of cows.

A further object is to provide such a system wherein the cows are parlored in a square herringbone arrangement thereby minimizing the distance between adjacent cows and further minimizing milk and feed transport and the like. These and other objects and advantages are provided in a milking system including means for controlling power to a milking machine and detection of abnormal milk comprising an electrically insulating conduit forming a closed loop, milk inlet and outlet conduit means for the loop, the inlet and outlet conduit means positioned at remote zones of the loop, a pair of transformer cores about the loop and in spaced-apart relation, separate windings on each of the transformer cores, an alternating current power supply connected to one of the windings, a measuring instrument connected to the other of the windings, and milk flow control means responsive to said measuring instrument; the invention may also include sequentially activated relays and timers connected to automatic stall gates, washers, feeders, and the like, to thereby reduce to a minimum man-time required during milking procedures.

The invention will be more particularly described in reference to the following drawing in which.

Figure 1:
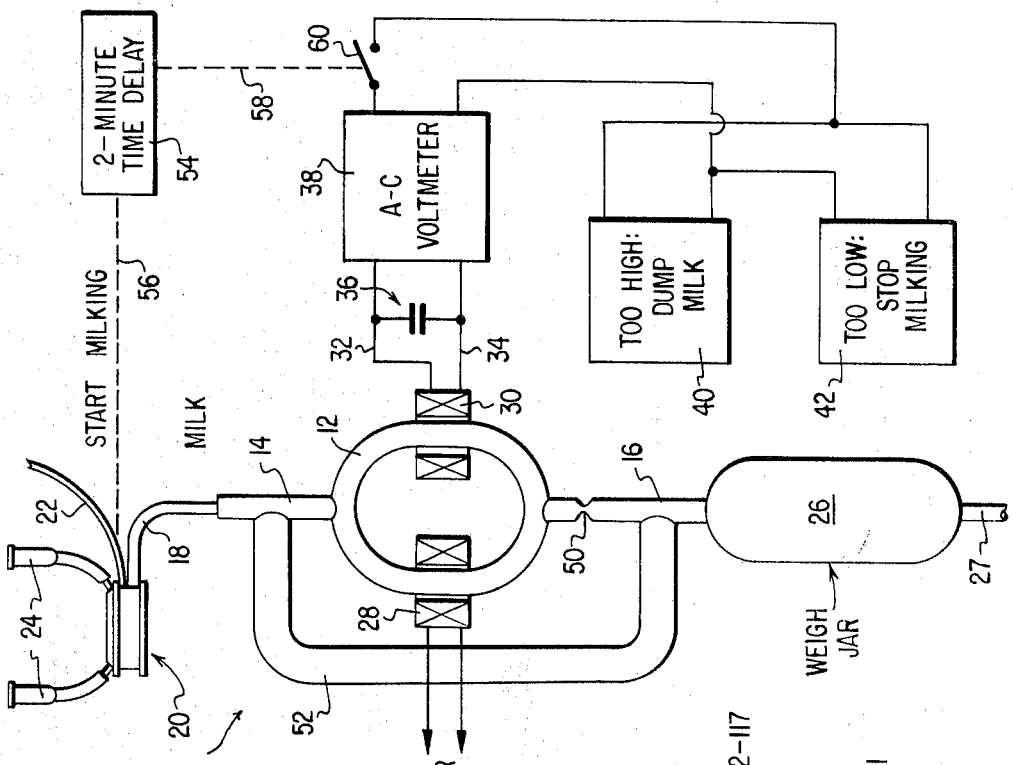
FIG. 1 is a diagrammatic view of an electrodeless milk monitoring device of the invention.

Referring to the drawings, and in particular to FIG. 1 thereof, 10 generally designates power controlling means for a milking system. The power controlling means includes a closed electrically insulating tubular conduit 12 having a milk inlet conduit 14 and a milk outlet conduit 16 connected thereto at remote zones of the closed loop 12. Conduit 14 is connected to the milk outlet pipe 18 of a milking claw generally designated 20 having a vacuum line 22 and a plurality of teat cups 24 of conventional design. The lower end of the outlet conduit 16 is connected to a weigh jar 26 having an outlet conduit 27 which may be connected through suitable valve means to a storage container for satisfactory milk or selectively to a separate storage area for abnormal milk as detected by the sensing means.

The assembly also includes a pair of transformer cores 28 and 30 which are toroidal in configuration and encircle the closed loop 12. Each of the cores 28 and 30 is provided with a transformer winding with the winding of core 28 being connected to an alternating current power supply as indicated in the drawings. A very satisfactory supply would be in the order of 3 kilocycles at 3 volts and .3 amperes. The other coil for core 30 is connected to an alternating current voltmeter having, for example a sensitivity of about 1 millivolt and a DC output, by conductors 32 and 34 across which is mounted a tuning condenser 36 of, for example, about 0.2 microfarad.

In a preferred embodiment the toroidal cores 28 and 30 are made of magnetic alloy such as Mumetal, a nickel-cooper-iron alloy of high permeability at low flux densities. Such a core in a preferred embodiment is wound with 33 turns.

The output from the voltmeter 38 is connected to flow control means generally indicated at 40 and 42 which are selectively responsive to the output from the voltmeter 38, such that if the sensed voltage is below a predetermined amount a relay in controller 42 disconnects the flow of vacuum to the milk claw 20 ending the milking cycle for the particular cow. If, however, the sensed voltage is above a predetermined amount, indicating an excessively conductive milk supply controller 40 bypasses the milk to an abnormal milk container from which it may be analyzed to determine the cause of the abnormality, following for example, the procedures in the Malcolm article in Proceedings of the Society of Agricultural Bacteriology (Great Britain) page 30, 1942, and/or the procedures set forth in the Davis et al. article in the Society of Agricultural Bacteriology (Great Britain) pages 43 to 45, 1945.

The screening via the controllers 40 and 42 is relatively simple with the improved conductivity monitor 10 as milk conductivity may increase by about 25 to 30 percent when the milk would be objectionable for human consumption. Further, when the conductivity is about the "dump milk" level a signal may be actuated so that the attendant may have that particular animal directed to an isolation zone or hospital for treatment as may be necessary.

Below the loop 12 and in the conduit 16 is a calibrated constriction 50 and the inlet and outlet conduits 14 and 16 are connected by a bypass passage 52 which permits the flow of milk to the weigh jar bypassing the loop 12 and constriction 50. The calibrated constriction assures that there will always be milk in the loop 12 as long as milk flows from the cow, above a predetermined flow rate. In addition, the calibrated constriction serves to compensate for variation in milk flow rate near the end of a milking when the flow rate is normally low. With the constriction, the passage 52 carries the bulk of the flow of milk from the milking claw to the weigh jar 26.

It will be recognized that the length and diameter of conduit 14 may be varied so as to provide a delay between the time when milk flow falls below a predetermined rate and the time when the milk in loop 12 no longer provides a closed path.

The system also includes a time delay relay 54 which is mechanically or electrically linked via means 56 to the actuating valve for the milking claw 20, and also linked via a link 58 to a switch 60 which connects the output from the voltmeter 38 to the operating sensors and relays 40 and 42. In an embodiment of the invention the controllers 40 and 42 comprise a single meter relay with both an upper and lower limit. The preferred embodiment is a solid state voltage-level detecting circuit with two settable reference voltages. The circuit activates relay 40 or relay 42 depending upon whether the signal voltage is greater than one of the preset reference voltages (relay 40) or less than the other preset reference voltages (relay 42). These are known in the art as "GO—NO GO Controllers" or "Analogue Comparator Relays".

Operation of the structures illustrated in FIG. 1 will be described following the description of a novel milking parlor to be described in reference to FIGS. 2 through 6. Referring to these figures, and in particularly FIGS. 2 and 3 thereof, 100 generally designates a milking parlor of the square herringbone configuration adapted for simultaneously handling up to 24 cows.

The parlor has a pair of inlet passages 102 and 104 and a pair of outlet passages 106 and 108, each of which is located at one of the apices of the square parlor. Along each of the exterior walls 110 of the structure are positioned six milking stalls, feed boxes, etc., which are indicated as 112, 113, 114, 115, 116 and 117. An automatically controlled gate 118 controls the ingress of cows to the bay 110a and a corresponding door or gate 120 controls the ingress of cows to bay 110b. Similar doors or gates 122 and 124 control the ingress of cows to bays 110c and 110d. Further, automatic doors 126 and 128 control the removal of cows from bays 110a and 110d, respectively, while the automatically controlled gates or doors 130 and 132 control the removal of cows from bays 110b and 110c, respectively.

Figure 3:
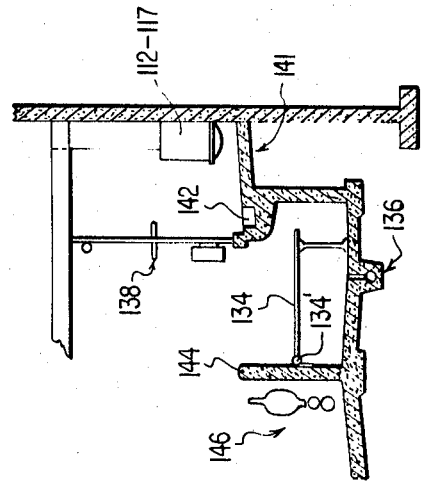
FIG. 3 is an enlarged diagrammatic view of one stall of the array illustrated in FIG. 2.

In FIG. 3 it will be seen that a raised platform 141 supports the cows in their bays 110a, b, c and d. A grid covers a gutter 142. Each of the cows is maintained in its stall by a rump rail 138 and an automatic feed box, say 113. The milker stands on a gridlike platform 134 beneath which is provided space for milk and vacuum hoses. 136 indicates a cleanout and drainage means.

As illustrated in FIG. 3 the inner ends 134' of each of the grates or grills 134 is supported from a wall 144 the other sides of which are maintained controls for the entire parlor and the individual milk receivers and the like, generally indicated at 146.

Figure 2:
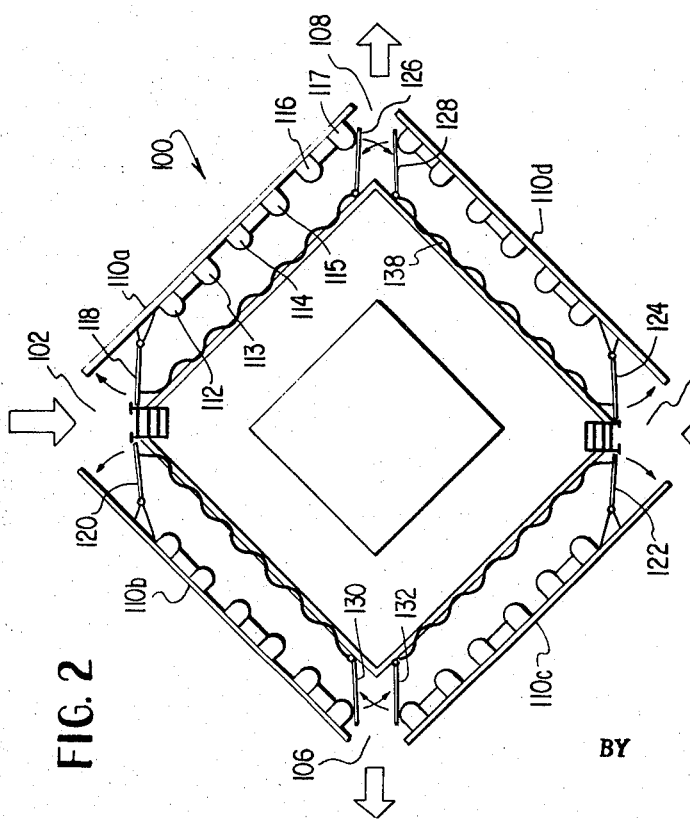
FIG. 2 is a diagrammatic view of a square herringbone array milking parlor having four major bays of six stalls each.
Figure 4:
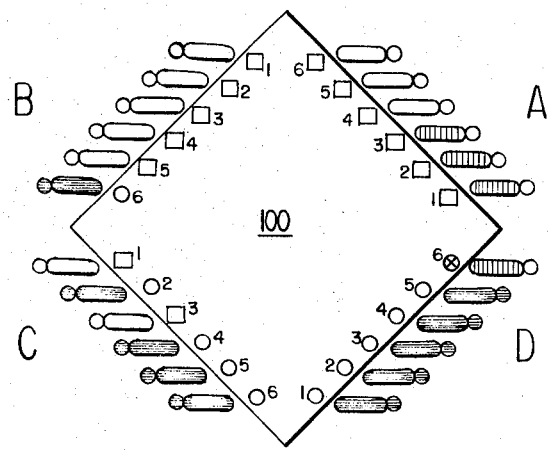
FIG. 4, 5 and 6 diagrammatically illustrate the sequential filling and unfilling of the stalls, milking and feeding procedures in a unit such as illustrated in FIGS. 2 and 3.
Figure 5:
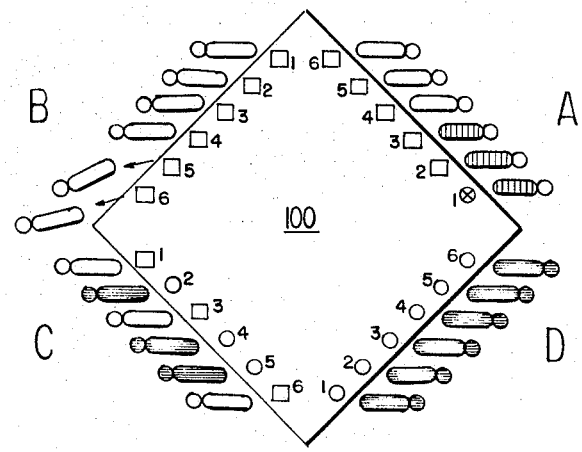
Figure 6:
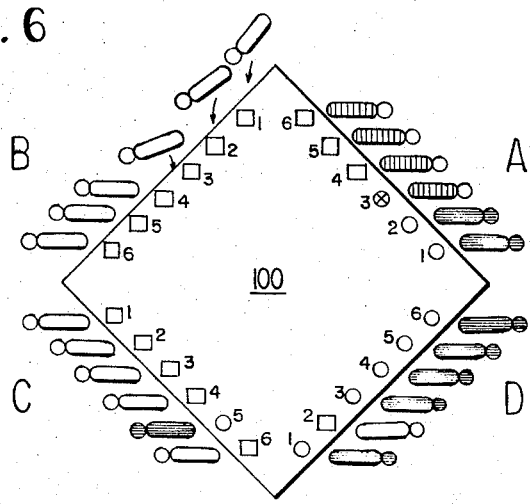

Operation of a parlor such as illustrated in FIGS. 2 and 3 in conjunction with the monitors illustrated in FIG. 1 is diagrammatically shown in FIGS. 4, 5 and 6 wherein each parlor 100 having the four sides A, B, C and D is illustrated as containing 24 cows, six in each of the four bays, with each of the cows lines to indicate its particular activity. For example, in FIG. 4 cows on side A have just arrived in their respective stalls and the time delay relay 54 for stall D2 has just actuated the warm water sprays to stimulate the cows in stalls A1, 2 and 3, while the attendant places a milking machine on cow D6 the last in row D. About 30 seconds later the time delay relay 54 connected at station D3 reaches the end of its cycle and if all of the cows in bay B have not had their milking machines removed "the end of the milking signals" are overridden and any remaining machines are removed to permit the end of a complete milking cycle for bay B, whereby exit gate 130 is opened and the feed boxes 112 through 117 for the cows in bay B are closed. The cows are then removed from their stalls as shown diagrammatically in FIG. 5. Simultaneously it will be seen from FIG. 5 that all of the cows in Bay D are being milked and that a portion of the cows in bay C have completed their milking cycle. Approximately 60 seconds after the expiration of the cycle as illustrated in FIG. 5 a new group of six cows will have entered and/or are entering their stalls in bay B and the time delay relay 54 for milking machine D-5 turns on the warm water milk stimulating sprays for cows 4, 5 and 6 of bay A while the milker is placing the milking machine on cow A3. With this sequence by the time the attendant has placed the milking machine on cow A6 all of the cows in bay B should have entered their stalls and bay C should then have completed its milking cycle so that these cows may be released and the bay refilled sequentially to begin a new cycle with the time delay relays of bay A controlling the release of cows from bay C and the actuation of the stimulators for bay B.

From the foregoing description of the square herringbone 24 stall milking parlor it will be recognized by those skilled in the art that the design has been conceived to take advantage of the desired decrease in mantime per cow required in present day systems. In general, in the disclosed system the attendant would check each of the cows udders, etc., and place the milking machines on the cows. A system of sprays would automatically wash the udders and stimulate milk letdown thus preparing the cows for milking. These activities would, as hereinbefore set forth, be initiated by the time delay relays associated with each of the monitors 10. After milking is completed each claw would be removed automatically by a machine detacher generally known in the art. It will also be recognized that cow traffic in the parlor is enhanced by the automatic operation of the gates and feed box covers controlled via the monitor systems 10 and their respective time delay relays 54. By eliminating the need for attendants at the gates etc., it is submitted that the milking rate can be increased from, for example, the present 40 to 50 cows per man hour to approximately 120 cows per man hour without materially increasing the cost over prior art automatic milking parlors. Control for the various functions is obtained, as described herein from the conductivity monitors associated with each milking station. It will also be recognized by those skilled in the art that while the conductivity readings are obtained via the meters 12, such meters are readily maintained in a sanitary condition in view of the absence of internal conductors or electrodes therein.

Further it will be recognized that while the invention has been described in reference to a particular form of milking parlor performing certain sequential procedures, other forms of milking parlors may be advantageously employed in conjunction with the monitors and the monitors may perform more or less than the recited functions. Further, it is pointed out that, although automatic control may be employed throughout the milking parlor, portions of the system such as gate operation, washing, etc., may be controlled manually by pushbuttons or similar devices.

We claim:

1. In a milking system means for controlling power to a milking machine including a milking claw and teat cups and milking machine teat cup detacher and detection of abnormal milk comprising an electrically insulating conduit forming a closed loop, milk inlet and outlet conduits for said loop, said inlet and said outlet conduits being positioned at remote zones of said loop, a pair of transformer cores about said loop and in spaced-apart relation, a separate winding on each of said cores, an alternating current power supply connected to one of the core windings, a measuring instrument connected to the other of said windings, and milk flow control means responsive to said measuring instrument and operatively connected to said milking machine.

2. The milking system as defined in claim 1 including a flow constriction in said outlet conduit and loop bypass conduit means connecting the inlet conduit and the outlet conduit downstream of the flow construction.

3. The invention defined in claim 1 wherein the said flow control means includes a pair of electrically actuated relays one of which is responsive to a voltage below a predetermined level and the other being responsive to a voltage above a predetermined level.

4. The invention defined in claim 2 including a time delay relay between said flow control means and said measuring instrument whereby said flow control means are not energized during a first portion of the milking cycle.

5. The invention defined in the preceding claim wherein the time delay relay is electrically connected to further relays for actuation of automatic stall gates, teat washers, feeders and the like to thereby reduce mantime normally required during milking procedures.